United States Patent
Bening

(10) Patent No.: US 11,370,957 B2
(45) Date of Patent: Jun. 28, 2022

(54) OIL-BASED SLURRIES AND METHODS FOR MAKING THEREOF

(71) Applicant: Kraton Polymers LLC, Houston, TX (US)

(72) Inventor: Robert C Bening, Houston, TX (US)

(73) Assignee: KRATON POLYMERS LLC, Houston, TX (US)

( * ) Notice: Subject to any disclaimer, the term of this patent is extended or adjusted under 35 U.S.C. 154(b) by 0 days.

(21) Appl. No.: 17/301,060

(22) Filed: Mar. 23, 2021

(65) Prior Publication Data

US 2021/0301193 A1 Sep. 30, 2021

Related U.S. Application Data

(60) Provisional application No. 63/000,181, filed on Mar. 26, 2020.

(51) Int. Cl.
*C09K 8/588* (2006.01)

(52) U.S. Cl.
CPC .................................. *C09K 8/588* (2013.01)

(58) Field of Classification Search
CPC .......... C09K 8/035; C09K 8/32; C09K 8/502; C09K 8/565; C09K 8/588; C09K 8/64; C09K 8/82
See application file for complete search history.

(56) References Cited

U.S. PATENT DOCUMENTS

| 3,595,942 A | 7/1971 | Wald |
| 3,634,549 A | 1/1972 | Shaw |
| 3,670,054 A | 6/1972 | De La Mare |
| 3,700,633 A | 10/1972 | Wald |
| 5,091,448 A * | 2/1992 | Hostettler ............... C04B 28/02 524/45 |
| 6,712,867 B1 | 3/2004 | Boocock |
| 8,378,132 B2 | 2/2013 | Lemke |
| 2008/0318812 A1* | 12/2008 | Kakadjian, Sr. ......... C09K 8/20 507/221 |
| 2009/0291871 A1* | 11/2009 | Chu ..................... C10M 161/00 508/539 |

* cited by examiner

*Primary Examiner* — Aiqun Li

(57) ABSTRACT

Disclosed herein is a copolymer concentrate in a bio-solvent that can be further diluted into a slurry composition. The bio-solvent facilitates the formation of a viscosified base fluid with the mixing being carried out in a short period of time and at ambient, providing a free flowing, pumpable, and dispersible slurry. The slurry is characterized as having excellent stability, maintaining suspension over a wide range of temperatures. In embodiments, the bio-solvent is selected from terpene and terpene-derivative-containing solvents, fatty acid alkyl esters, and mixtures thereof. The bio-solvent can be first mixed with a styrenic diblock copolymer to form a concentrate prior mixing with a hydrocarbon solvent, forming a viscosified base fluid for subsequent mixing with a water-soluble polymer to form the slurry. The bio-solvent can also be used to dilute the hydrocarbon solvent, prior to mixing with the styrenic diblock copolymer to form the viscosified base fluid.

11 Claims, No Drawings

OIL-BASED SLURRIES AND METHODS FOR MAKING THEREOF

RELATED APPLICATIONS

This application claims priority from U.S. Provisional Application No. 63/000,181, with a filing date of Mar. 26, 2020, which disclosure is incorporated herein by reference.

TECHNICAL FIELD

The disclosure relates to a concentrate compostions for making suspension solution for use in underground formations.

BACKGROUND

Enhanced oil recovery or EOR is the process of increasing the amount of petroleum that can be recovered from underground or subterranean formations, typically by injecting a substance into an existing oil well/formation to increase the pressure to force petroleum out of the ground. Chemical EOR is a method wherein a dilute solution containing chemicals is injected into the formation to aid mobility and to reduce surface tension of the oil, facilitating recovery. Hydraulic fracturing or fracking is a well stimulation technique in which rock is fractured by a pressurized composition containing water, proppants such as sand, and chemicals under high pressure into the formation.

In these applications, oil needs to be suspended and pumped to the surface. Compositions for use in EOR or fracturing applications can be prepared from a slurry composition containing a water-soluble component. Certain styrenic block copolymers have been shown to provide exceptional long term suspension of water soluble materials used in this application. However, it is often a challenge to blend these rheology modifiers into the base fluid at operating temperatures of the blending units to form the slurry, with the mixing typically taking at least 40 minutes, or at least 60 minutes, or at least 90 minutes, and at a temperature typically of >80° F., or >90° F.

There is a need for a pumpable polymer concentrate in a renewable resource-based solvent that can be further diluted into a slurry composition, by mixing in a short period of time and at ambient temperature, providing a free flowing, pumpable, and dispersible slurry. The slurry is characterized as having excellent stability, maintaining suspension over a wide range of temperatures to facilitate the EOR or fracturing operation.

SUMMARY

In one aspect, the disclosure relates to a method for making a slurry for subsequent dilution, forming a fluid for injection into a subterranean formation. The method comprises: providing a mixture comprising: a suspension agent comprising a styrenic diblock copolymer, a bio-solvent, and a hydrocarbon solvent; adding a water-soluble polymer into the mixture forming the slurry, for a concentration of water-soluble polymer of 40-70 wt. % based on the total wt. % of the slurry. The styrenic diblock copolymer has a formula A-B, wherein A is a monoalkenyl arene and B is a conjugated diene block. The bio-solvent is selected from terpene and terpene-derivative-containing solvents, fatty acid alkyl esters, and mixtures thereof. The hydrocarbon solvent is selected from mineral oils, kerosene, jet-fuel, white oils, diesel oils, olefins, organic esters, synthetic fluids, and mixtures thereof. The water-soluble polymer is selected from water-based polysaccharides, polyethylene oxide, acrylamide polymers, and mixtures thereof. The styrenic diblock copolymer maintains the water-soluble polymer in suspension in the slurry with less than 3 wt. % free hydrocarbon solvent separation after at least 1 day standing.

In another aspect, the mixture of styrenic diblock copolymer, bio-solvent and hydrocarbon solvent comprises: providing a pourable concentrate composition comprising >10 wt. % of the styrenic diblock copolymer in the bio-solvent; and dissolving the pourable concentrate composition in a sufficient amount of hydrocarbon solvent for a mixture having a concentration of 1 to 3 wt. % of the styrenic block copolymer.

In another aspect, the mixture of styrenic diblock copolymer, bio-solvent and hydrocarbon solvent comprises: dissolving a sufficient amount of the styrenic block copolymer into a base oil liquid carrier forming a viscosified base fluid having from 1-3 wt. % of the styrenic block copolymer; wherein the liquid carrier comprises the hydrocarbon solvent and the bio-solvent.

DESCRIPTION

The following terms used the specification have the following meanings:

"Subterranean formation" or "underground formation" encompasses both areas below exposed earth and areas below earth covered by water, e.g., sea or ocean.

"Pumpable" or "pourable" refers to a composition having a viscosity of <10,000 cP, and preferably <5,000 cP at a shear rate of 600 $s^1$, such as measured at 300 RPM using a Fann-type viscometer with an R1B1 bob, at ambient temperature.

"Stable" means a kinetically stable composition that absent any force applied, temperature change, or chemical added, is or is capable of being substantially free of coagulation, plating out, precipitation, gross coalescence of phases (conventionally referred to as "separation") or any other evidence of instability for at least about 24 hours.

"Storage stable" means that the composition is stable after at least one month of storage at temperatures between about ambient and 65° C. (150° F.).

"Molecular weight" (MW) refers to the styrene equivalent molecular weight in kg/mol of the polymer block or the block copolymer. MW can be measured with gel permeation chromatography (GPC) using polystyrene calibration standards according to ASTM 5296-19. The chromatograph can be calibrated using commercially available polystyrene molecular weight standards. The styrene equivalent MW can be converted to true molecular weight when the styrene content of the polymer and the vinyl content of the diene segments are known. The detector can be a combination ultraviolet and refractive index detector.

"Peak molecular weight" refers to the MW measured at the peak of the GPC trace, unless otherwise specified, molecular weights are styrene equivalent, as described above.

The disclosure relates to a pumpable polymer concentrate composition with at least 10 wt. % of a styrenic block copolymer in a bio-based solvent, for dilution with hydrocarbon base fluids to prepare a water-soluble polymer suspension (slurry) with the styrenic block copolymer as the suspending agents. The slurry is for subsequent mixing into water source such as produced water, for pumping into underground formations.

Bio-based Solvent: The solvents used herein are derived at least in part from conversion of agricultural and forest based renewable resources, and processed by conventional chemical modifications and/or by biological processes such as fermentation. The carbon source for the solvents is derived from a renewable plant crop/tree resource unlike conventional fossil derived carbon source that is finite and is fast depleting. In embodiments, the solvents are characterized as capable of dissolving the styrene block in the styrenic block copolymer, and not forming highly structure micelle solutions which would make the polymer concentrate not pumpable.

In embodiments, the bio-solvent is selected from terpene and terpene-derivative-containing solvents. Terpene-containing solvents include, but are not limited to, monoterpenes, diterpenes, triterpenes, tetraterpenes, sesquiterpenes, sesterterpenes and combinations thereof. Examples include limonene, pinene, dipentene (the racemic mixture of the two limonene isomers d-limonene and l-limonene), myrcene, terpinene, terpinoline, camphene, and carotene. Other examples include solid terpenes (e.g. carotene) and solid terpene derivatives (e.g. retinoic acid) dissolved in another solvent for reaction with an acid, and combinations thereof. Example terpene derivatives include but are not necessarily limited to terpene alcohols, terpene aldehydes, terpene acids, and partially saturated terpenes. Specific examples include retinol, retinal, retinoic acid, carvone and the like.

In embodiments, the bio-based solvent is selected from fatty acid alkyl esters, including esters selected from C1-C4 ester of a C16-C20 fatty acid as disclosed in U.S. Pat. No. 6,712,867B1 and U.S. Pat. No. 8,378,132B1, incorporated herein by reference. In embodiments, the solvent is an ester of a mixture of oleic and linoleic acid. Examples include rapeseed oil methyl ester and soy-based methyl ester, e.g., methyl soy ester materials.

If used in making a polymer concentrate, the bio-based solvent is used in an amount of >60 wt. %, or >65 wt. %, or >70 wt. %, or >80 wt. % or up to 90 wt. %, or 60-90 wt. %, or 65-85 wt. %, or 70-80 wt. %, based on the total weight of the polymer concentrate, with the remainder being the styrenic block copolymer.

If the bio-based solvent is added as a diluent to the liquid carrier hydrocarbon solvent (prior to adding the styrenic block copolymer component), the bio-solvent is present in an amount of >5 wt. %, or >7 wt. %, or >10 wt. %, or >15 wt. % or up to 20 wt. %, or 5-20 wt. %, or 10-20 wt. %, or 5-15 wt. %, based on the total weight of the liquid carrier, with the remainder being the hydrocarbon solvent.

Styrenic Block Copolymer Suspension Component: The suspension agent for making a polymer concentrate comprises a styrenic block copolymer ("SBC") of formula A-B, wherein the A segment is a monoalkenyl arene block, B is a conjugated diene block. In embodiments, the copolymer is a hydrogenated styrene-(ethylene/propylene) (SEP) block copolymer.

The copolymer can be made by a sequential polymerization process in which the first step comprises polymerizing isoprene with an organolithium initiator until polymerization of the isoprene is substantially complete. In a second step, a mono vinyl aromatic monomer, generally styrene, is copolymerized from the living polymer block of polyisoprene produced from the first step. Polymerization occurs spontaneously, and is allowed to proceed until substantially all the monomers have polymerized to form a poly(isoprene)-poly(mono vinyl aromatic/conjugated diene) copolymer diblock. The polyisoprene block is then hydrogenated under conditions that preserve the aromatic unsaturation in the styrene block, resulting in a product in which the hydrogenated isoprene segment is described as an "ethylene propylene" (EP), segment as hydrogenation of the predominant 1,4 isoprene repeat unit results in a structure identical to one ethylene and one propylene repeat unit.

Selective hydrogenation can be carried out via any of the several processes known in the prior art. For example, such hydrogenation has been accomplished using methods such as those taught in, for example, U.S. Pat. Nos. 3,595,942; 3,634,549; 3,670,054; 3,700,633; and Re. 27,145, the disclosures of which are incorporated herein by reference. These methods operate to hydrogenate polymers containing aromatic or ethylenic unsaturation and are based upon operation of a suitable catalyst. Such catalyst, or catalyst precursor, preferably comprises a Group VIII metal such as nickel or cobalt, which is combined with a suitable reducing agent such as an aluminum alkyl or hydride of a metal selected from Groups I-A, II-A and III-B of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Selective hydrogenation can be carried out under such conditions that at least about 90 mol % of the isoprene double bonds have been reduced, and between 0 and 10 mol % of the arene double bonds present in the polymerized styrene units have been reduced. Preferred ranges are at least about 95 mol % of the isoprene double bonds reduced, and more preferably about 98 mol % of the isoprene double bonds are reduced.

In embodiments, the copolymer has a has a peak molecular weight of 200-250 kg/mole, or at least 220 kg/mole; a polystyrene (PSC) content of 30-50%, or at least 32%, or at least 34%, or less than 42%, or less than 40%, or 35-37%.

In embodiments, the copolymer is coated with a dusting agent in an amount from 0.02 to 2 wt. % (based on the total weight of the block copolymer), or at least 0.1 wt. %, and or 0.2 to 0.8 wt. %. The dusting agents in embodiments are selected from fumed silica, talcs, calcium carbonate, and the like. In embodiments, the dusting agent is a hydrophilic fumed silica having a surface area (BET, measured by nitrogen gas adsorption) of 175-500 m$^2$/g. In embodiments, the dusting agent is a hydrophilic fumed silica with a tamped density of <75 g/L, a surface area (BET) of at least 200 m$^2$/g, and a pH of 3 to 5.

The amount of copolymer for use in the concentrate ranges from 10-40 wt. %, or 10-30 wt. %, or at least 10 wt. %, 12 wt. %, or at least 15 wt. %, or less than 35 wt. %, or less than 30 wt. %, based on the total weight of the concentrate. In embodiments, the copolymer is present in a sufficient amount to fully dissolve in the bio-solvent, forming a fluid that is not highly structured, and behaves like a Newtonian or shear-thinning fluid.

Optional Components: In embodiments, the concentrates comprise conventional additives, e.g., corrosion inhibitors, surfactants, demulsifying agents, pH modifiers, scale inhibitors, asphaltene inhibitors, paraffin inhibitors, gas hydrate inhibitors, dispersants, fibers, conditioning agents, oxygen scavengers, biocides and the like. The amount of additives ranges from 0.1 to 3 wt. %, or 0.25 to 2.5 wt. %, or <2 wt. %, or >0.5 wt. %, based on the total weight of the concentrate.

Methods for Forming Concentrate Composition: The concentrate is prepared from the copolymer in a powder form, by blending or mixing into the bio-solvent until the copolymer is completely dissolved, for a transparent or translucent solution. In embodiments, the mixing is initially at high shear, and subsequently at a lower speed to maintain the temperature at up to the flash point of the bio-solvent, e.g., <66° C. (150° F.), or <52° C. (125° F.), or <43° C. (110° F.) depending on the bio-solvent used. In embodiments, the mixing is for <30 minutes, or <20 minutes, or <15 minutes.

After mixing, the concentrate can be stored in drums or tanks for transport to sites (customer sites, or production sites at or near drilling sites), where the concentrate is used to prepare a slurry use in the hydration process.

Method for Forming Slurry Compositions: In embodiments, the concentrate is diluted with a liquid carrier hydrocarbon solvent and then a water soluble polymer is added, forming a slurry composition by mixing for <1 hour or less until completely homogenized. The dilution of the concentrate into the base oil liquid carrier can be carried out at or near ambient temperature, with complete mixing in 30 minutes or less.

In embodiments, the mixing is at ambient temperature, or <52° C. (125° F.), or <43° C. (110° F.), or <38° C. (100° F.), and for <30 minutes, or <20 minutes, or <15 minutes. The mixing requires much less shear energy, e.g., less than ½, or less than ⅓, or less than ¼, the amount of shear energy required to prepare a slurry by directly blending the copolymer in a powder form with the base oil liquid carrier and a water soluble polymer.

In embodiments, a slurry is formed from a bio-solvent without first making a concentrate. A viscosified base fluid is first prepared by directly blending the copolymer in a powder form with a mixture of base oil liquid carrier and bio-solvent, at a weight ratio of 5:95 to 15:85, or from 10:90 to 12:88, or 7:93 bio-solvent to base oil. The base oil liquid carrier and bio-solvent can be added to the copolymer as a mixture, or all components can be added/mixed together concurrently.

The addition of a bio-solvent even in small amounts can lower the temperature needed to equilibrate the block copolymer, thus providing suspension, without dramatically decreasing the stability of the suspension at higher temperatures. In embodiments, the addition of 3-15 wt. % to the base fluid (based on total liquid carrier concentration of hydrocarbon solvent and bio-solvent) lowers the mixing temperature, or $T_{min}$ Mix, at least −12° C. (10° F.) compared to the mixing temperature obtained with hydrocarbon solvent only as liquid carrier. $T_{min}$ Mix is defined as a temperature to produce a fluid with a shear stress value at 0.01 s−1 of at least 1 Pa at 21° C. (70° F.).

The hydrocarbon solvent can be any hydrocarbon solvent, e.g., that does not hydrate the water-soluble polymer and is a poorer solvent for the styrene block of the SEP copolymer than the bio-based solvent used to prepare the concentrate. In embodiments, the hydrocarbon solvent is selected from mineral oil, kerosene, jet-fuel, white oils, diesel oils, olefins (POA or polyalpha olefins), organic esters, synthetic fluids, and mixtures thereof. The hydrocarbon solvent is added in a sufficient amount for a concentration of 60-90 wt. %, or 70-85%, or less than 90%, or at least 70% of the total solvent present in the final slurry composition.

The water-soluble polymer for adding to the concentrate before, after, or concurrent with the addition of the liquid carrier to make a slurry, can be synthetic or natural. Water-soluble polymer refers to substances that dissolve, disperse or swell in water and, thus, modify the physical properties of aqueous systems in the form of gellation, thickening or emulsification/stabilization. Examples include a natural material, a water-based polysaccharide such as cellulose or starch and derivatives, xanthan or xanthan derivatives, or guar and derivatives thereof, a synthetic polymer such as polyethylene oxide, polyacrylamide or acrylamide polymer, e.g., acrylamide homopolymers and copolymers of acrylamide with other monomers such as acrylamide-acrylate copolymer. The water-soluble polymer is added to the concentrate in a sufficient amount for a concentration in the slurry ranging from 40-70 wt. %, or 45-65%, or less than 60%, or at least 45% based on the total weight of the slurry.

In addition to the hydrocarbon solvent(s) as liquid carrier, water soluble polymer, optional additives (as listed above for the concentrate) can be added at the time of diluting the concentrate to form a suspension slurry.

Properties & Applications: The concentrate can be used for preparing completion fluids, production fluids and other fluids for use in oil and gas operations such as drilling, stimulations, etc. where hydratable polymers are used. It can also be used in waste water treatment, as a flocculant or as a dehydrating agent, in paper manufacturing as a paper chemical or sizing agent, or in textile printing as thickeners.

With the addition of the concentrate and/or bio-solvent, a slurry prepared therefrom is characterized as having adequate stability during the manufacturing process and after (in storage), and can be readily dispersed or diluted into water to facilitate the rapid release of the water-soluble polymer. In embodiments, the addition of the copolymer even in concentration as low as 2 wt. % (based on the total weight of the hydrocarbon solvent) imparts a thixotropic behavior to the viscosified base fluid, improving the solids suspending properties of the slurry, allowing the slurry composition to be heated up to above 38° C. (100° F.), or above 49° C. (120° F.), or up to 66° C. (150° F.), with stable suspension (minimal sign of settling) after many hours of standing, for use in production fields/hydraulic fracturing applications with improved efficiency.

The slurry viscosity varies according to the type of hydrocarbon solvent employed and/or the amount and type of water-swellable polymer used, e.g., a viscosity in the range of 500-2200 cp (measured at 21° C. (70° F.) and 300 rpm with Fann type viscometer), or at most 2000 cp, or at most 1700 cp.

The slurry maintains suspension for a period of >3 days, and at a wide range of temperatures is not limited for use in EOR/hydraulic fracturing operations. In operation, the slurry is added to an aqueous stream, e.g., produced water or brine, at production site, allowing the water-soluble polymer to hydrate or released into water.

Examples: The following examples are intended to be non-limiting.

The following components were used in the examples:

Suspending Agent SBC1 is a diblock copolymer having a polystyrene content (PSC in wt. %) of 36.6, and a peak polystyrene equivalent MW of 147 kg/mole.

Suspending Agent SBC2 is a diblock copolymer having a PSC of 28, and a peak polystyrene equivalent MW of 206 kg/mole.

Suspending Agent SBC3 is a diblock copolymer having a PSC of 48, and a peak polystyrene equivalent MW of 260 kg/mole.

Suspending Agent SBC4 is a diblock copolymer having a PSC of 36%, and a peak polystyrene equivalent MW of 226 kg/mole.

Bio-solvent 1 is a mix of 70-75% dipentene and 15-20% beta-phellandrene derived from crude sulfate turpentine from Kraton Corporation, with a flash point of 123.8° F.

Bio-solvent 2 is a methyl ester derived from soybean oil.

Bio-solvent 3 is a methyl ester derived from rapeseed oil.

Bio-solvent 4 is a mix of 70-75% dipentene and 2-5% beta-pinene, and 15-20% beta-phellandrene derived from crude sulfate turpentine from Kraton Corporation, with a flash point of 123.8° F.

Bio-solvent 5 is d-limonene.

Solvent 1 is a low aromatic/polycyclic aromatic petroleum distillate base oil with a flash point of 81° C., a pour point of −39° C., and a viscosity at 40° C. of 1.6 cSt.

Solvent 2 is a synthetic base fluid (Fischer-Trospch GTL—Group III) derived from natural gas feedstock, with a flash point of 85° C., a pour point of −39° C., and a viscosity at 40° C. of 3 cSt.

Solvent 3 is a mixture of hydrotreated isoparaffins and naphthenics with very low levels of polynuclear aromatics, with a flash point of >60° C., a pour point of <−21° C., and a viscosity at 40° C. of 1.6 cSt.

In the examples, all viscosity measurements were made using an Anton Paar MCR rheometer (concentric cylinder geometry). Shear stress at 0.01 s−1 is used as the effective yield stress.

In the examples, concentrates were prepared from copolymer and bio-solvent in 400 ml beaker, by high shear mixing with a Sylverson mixer without external heating. The initial mixing was maintained at ~ 4500 rpm until the solution temperature got up to about the flashpoint of the bio-solvent, after which the mixing speed was lowered to ~ 2000 rpm to maintain the temperature close to or lower than the flashpoint of the bio-solvent. Mixing was stopped when the concentrate solution turned transparent (or translucent) with a slight yellowish tint due to the color of the bio-solvent, in some cases. Concentrate solutions with viscosities <~5000 cp are pumpable with process equipment.

Examples 1-3: Concentrates were made having the compositions as shown in Table 1. Viscosity as a function of shear rate curves was measured from 0.01-600 s−1 at 72° F.

TABLE 1

| Example | Polymer | Solvent | Polymer Conc. % wt. | Viscosity (cP) |
|---|---|---|---|---|
| 1 | SBC1 | Bio-solvent 1 | 15 | 1,216 |
| 2 | SBC2 | Bio-solvent 1 | 15 | 4,233 |
| 3 | SBC3 | Bio-solvent 1 | 12 | 1,038 |

Examples 4-6: Concentrates in examples 1-3 were diluted with a sufficient quantity of Solvent 1 to bring the polymer concentration to 4 wt. % in the resulting mixture, forming viscosified base fluid samples. The mixing was at 500 rpm at ambient temperature 75-80° F., until the solution was fully mixed (about 15 minutes), then surfactant in an amount sufficient for a final concentration in the slurry of 1 wt. % was added to the samples and remixed for 10 minutes. These samples are referred to as viscosified base fluids.

The weight percent of bio-solvent in the resulting solvent blend is listed in Table 2. Measurement of a shear stress value of greater than or equal to about 1 Pa at a shear rate of 0.01 s$^{-1}$, at a given temperature suggest that the fluid will have sufficient yield stress to suspend particles such as guar or polyacrylamide. To better define the maximum temperature at which yield stress could be observed, shear rate sweeps were performed in a stepped temperature manner, starting at 70° F. and increasing the temperature in 10° F. increments until the final temperature of 120° F. was reached. The maximum temperature at which this requirement ($T_{max}$YS) is satisfied is shown in Table 2. Viscosified solutions prepared by dilution of the corresponding concentrates are stable (suspending articles) up to the temperatures as shown.

TABLE 2

| Example | Co-polymer | Polymer conc. % wt. | Bio-solvent 1 conc. % wt. | $T_{max}$ YS ° F. |
|---|---|---|---|---|
| 4 | SBC1 | 4 | 22.7 | 100 |
| 5 | SBC2 | 4 | 22.7 | 90 |
| 6 | SBC3 | 4 | 29.3 | 125 |

Examples 7-9: Concentrates were made with Bio-solvent 2. Viscosities of the Concentrate solutions at 72° F. and 88.5 s$^{-1}$ are summarized in Table 3.

TABLE 3

| Example | Polymer | Solvent | Polymer Conc. % wt. | Viscosity (cP) |
|---|---|---|---|---|
| 7 | SBC1 | Bio-solvent 2 | 15 | 7,837 |
| 8 | SBC2 | Bio-solvent 2 | 15 | 31,319 |
| 9 | SBC3 | Bio-solvent 2 | 15 | 14,991 |

Examples 10-12: Concentrates in examples 7-9 were diluted with a sufficient quantity of Solvent 1 to bring the polymer concentration to 4 wt. %. Shear stress data was collected in 10° F. steps from 70° F. to 120° F. to determine the maximum temperature at which the fluids exhibit effective yield stress values (shear stress at 0.01 s$^{-1}$) of at least about 1 Pa. Results of the viscosified base fluids are shown in Table 4:

TABLE 4

| Example | Polymer | Polymer conc. % wt. | Bio-solvent 2 conc. % wt. | $T_{max}$ YS ° F. |
|---|---|---|---|---|
| 10 | SBC1 | 4 | 22.7 | 80 |
| 11 | SBC2 | 4 | 22.7 | 70 |
| 12 | SBC3 | 4 | 22.7 | 120 |

Examples 13-15: Concentrates were made with Bio-solvent 3. Viscosities of these fluids at 600 s$^{-1}$ at 72° F. were measured and reported in Table 5.

TABLE 5

| Example | Polymer | Solvent | Polymer conc. % wt. | $T_{max}$ YS ° F. |
|---|---|---|---|---|
| 13 | SBC1 | Bio-solvent 3 | 15 | 4,884 |
| 14 | SBC2 | Bio-solvent 3 | 15 | 22,796 |
| 15 | SBC3 | Bio-solvent 3 | 12 | 3,863 |

Examples 16-18: Concentrates in examples 13-15 were diluted with a sufficient quantity of Solvent 1 to bring the polymer concentration of the viscosified base fluids to 4 wt. %. Shear stress data was collected in 10° F. steps from 70° F. to 120° F. to determine the maximum temperature at which the fluids exhibit effective yield stress values (shear stress at 0.01 s$^{-1}$) of at least about 1 Pa. Results are shown in Table 6:

TABLE 6

| Example | Polymer | Polymer conc. % wt. | Bio-solvent 3 conc. % wt. | $T_{max}$ YS ° F. |
|---|---|---|---|---|
| 16 | SBC1 | 4 | 22.7 | 90 |
| 17 | SBC2 | 4 | 22.7 | 80 |
| 18 | SBC3 | 4 | 29.3 | 120 |

Examples 19-22: Concentrates were prepared with a 15% wt. solution of polymer SBC4 dissolved in Bio-solvent 4. Solutions were prepared from the concentrates, with polymer concentrations of 3% and 4% wt. by dilution of the concentrates with either Solvent 1 or Solvent 2. The effective yield stress values as a function of temperature were measured. The maximum temperature at which this value remains of the order of 1 Pa or greater is reported in Table 7.

TABLE 7

| Example | Base fluid | Polymer conc. % wt. | Bio-solvent 4 conc. % wt. | $T_{max}$ YS ° F./ YS Pa |
|---|---|---|---|---|
| 19 | Solvent 1 | 3 | 18.4 | 120/2.43 |
| 20 | Solvent 1 | 4 | 24.6 | 120/0.73 |
| 21 | Solvent 2 | 3 | 18.4 | 150/2.7 |
| 22 | Solvent 2 | 4 | 24.6 | 1504.1 |

Examples 23-28: In these examples, viscosified base fluid solutions are prepared from a polymer concentrate as in previous examples, by diluting 14% wt solution of SBC4 in Bio-solvent 1 with a sufficient quantity of Solvent 2 to produce the polymer concentrations listed in Table 8. No minimum temperature of equilibration time was required to produce a viscosified base fluid capable of particle suspension. 4 pound per gallon (ppg) guar slurries were prepared from the viscosified base fluids by mixing at an increasing speed up to 2100 rpm while adding the guar. Once all the guar had been added, the speed was kept at 2100 rpm until temperature reached the mixing temperature used to prepare the corresponding viscosified base fluid, then lowered to 1800 rpm. Temperature was maintained at about 80° F. for 60 minutes of mixing.

The stability of these suspensions was assessed using a Turbiscan AGS high throughput stability analyzer. Samples exhibiting Turbiscan Stability Index (TSI) values less than about 2.0 exhibit no visible separation (observable clear oil layer). TSI values were collected every two hours for a total of 72 hours at 110° F., 120° F. and 150° F. Results are summarized in Table 8.

TABLE 8

| Example | Polymer Conc. (% wt.) | Bio-solvent 1 conc. (% wt.) | Temperature (° F.) | TSI value after 72 hours |
|---|---|---|---|---|
| 23 | 3 | 18.4 | 110 | 0.95 |
| 24 | 3 | 18.4 | 120 | 0.5 |
| 25 | 3 | 18.4 | 150 | 0.55 |
| 26 | 2.5 | 15.4 | 110 | 0.85 |
| 27 | 2.5 | 15.4 | 120 | 0.6 |
| 28 | 2.5 | 15.4 | 150 | 0.7 |

Examples 29-33: The examples are to evaluate slurry compositions prepared by adding SBC to a mixture of hydrocarbon solvent and bio-solvents. 3% wt. viscosified base fluid solutions were prepared by mixing SBC3 were prepared in the base fluid of Solvent 3, or blend of Solvent 3 and a bio-solvent as specified in Table 9 by mixing at 500 RPM using a paddle, starting at 70° F. and increasing the temperature in 10° F. increments. Fluids are mixed for at least 30 minutes before increasing the temperature. Solutions typically proceed from a milky, low viscosity suspension, to a viscous, but bluish, turbid gel, finally reaching a clear, pale blue appearance when well-equilibrated. As the fluids began to approach this appearance, samples were collected and shear rate sweeps were conducted. A sample was considered equilibrated if it exhibited an effective yield stress of at least 1 Pa, as defined above, at 70° F. This temperature, defined as $T_{min}$ Mix is recorded in Table 9.

Guar suspensions were prepared as described above, except that 1% wt. (on the final composition) of a non-ionic surfactant (TDA-9) was also added. Suspensions were aged in graduated cylinders at 120° F., 140° F. and 150° F. The highest temperature or $T_{max}$ Suspension at which the suspension exhibited less than 3% free oil after 1 day, and less than 5% free oil after 7 days is recorded below.

TABLE 9

| Example | Bio-Solvent | % Cosolvent (of fluid) | $T_{min}$ Mix (° F.) | $T_{max}$ Suspension (° F.) |
|---|---|---|---|---|
| 29 | None | — | 110 | 150 |
| 30 | Bio-solvent 1 | 10 | 90 | 150 |
| 31 | Bio-solvent 1 | 5 | 100 | 150 |
| 32 | Bio-solvent 5 | 10 | 90 | 140 |
| 33 | Bio-solvent 5 | 5 | 100 | 150 |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, all technical and scientific terms used herein have the same meanings as commonly understood by one of skill in the art to which the disclosed disclosure belongs. the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method for making a slurry for subsequent dilution, forming a fluid for injection into a subterranean formation, the method comprising:
   a) dissolving a styrenic diblock copolymer in amount of equal to or greater than 15 wt. % in a bio-solvent, forming a pourable concentrate having a viscosity of less than 10,000 cP at a shear rate of $600 \text{ s}^{-1}$;
   b) dissolving the pourable concentrate in a sufficient amount of a hydrocarbon solvent forming a mixture having a concentration of 1 to 3 wt. % of the styrenic diblock copolymer; and
   c) adding a water-soluble polymer into the mixture forming the slurry, for a concentration of the water-soluble polymer of 40-70 wt. % based on the total wt. % of the slurry;
   wherein the styrenic diblock copolymer has a formula A-B, wherein A is a monoalkenyl arene and B is a conjugated diene block;
   wherein the bio-solvent is selected from the group consisting of terpene and terpene-derivative-containing solvents, fatty acid alkyl esters, and mixtures thereof;
   wherein the hydrocarbon solvent is selected from the group consisting of mineral oils, kerosene, jet-fuel, white oils, diesel oils, olefins, organic esters, synthetic fluids, and mixtures thereof;
   wherein the water-soluble polymer is selected from the group consisting of water-based polysaccharides, polyethylene oxide, acrylamide polymers, and mixtures thereof; and
   wherein the styrenic diblock copolymer maintains the water-soluble polymer in suspension in the slurry with less than 3 wt. % free hydrocarbon solvent separation after at least 1 day standing.

2. The method of claim 1, wherein the pourable concentrate composition further comprises additives in an amount of at >0.5 wt. %, based on the total weight of the pourable concentrate composition.

3. The method of claim 1, wherein the bio-solvent is present in an amount of >60 wt. %, based on the total weight of the pourable concentrate composition.

4. The method of claim 1, wherein the bio-solvent is present in an amount of >5 wt. %, based on the total weight of the bio-solvent and the hydrocarbon solvent.

5. The method of claim 1, wherein the hydrocarbon solvent and the bio-solvent are present at a weight ratio of 5:95 to 15:85.

6. The method of claim 1, wherein the styrenic diblock copolymer is a hydrogenated styrene-(ethylene/propylene) styrene (SEPS) block copolymer.

7. The method of claim 1, wherein the styrenic diblock copolymer has a peak molecular weight of 200-250 kg/mole and a polystyrene (PSC) content of 30-50%.

8. The method of claim 1, wherein the styrenic diblock copolymer is coated with a dusting agent in an amount of 0.02 to 2 wt. %, based on the total weight of the styrenic diblock copolymer;
   wherein the dusting agents is selected from the group consisting of fumed silica, talc, calcium carbonate, and mixtures thereof.

9. The method of claim 1, wherein the slurry has a Turbiscan Stability Index of ≤2.0.

10. A slurry prepared by the method of claim 1.

11. The slurry of claim 10, wherein the slurry has a viscosity of 500-2200 cp.

* * * * *